Figures 1, 2:
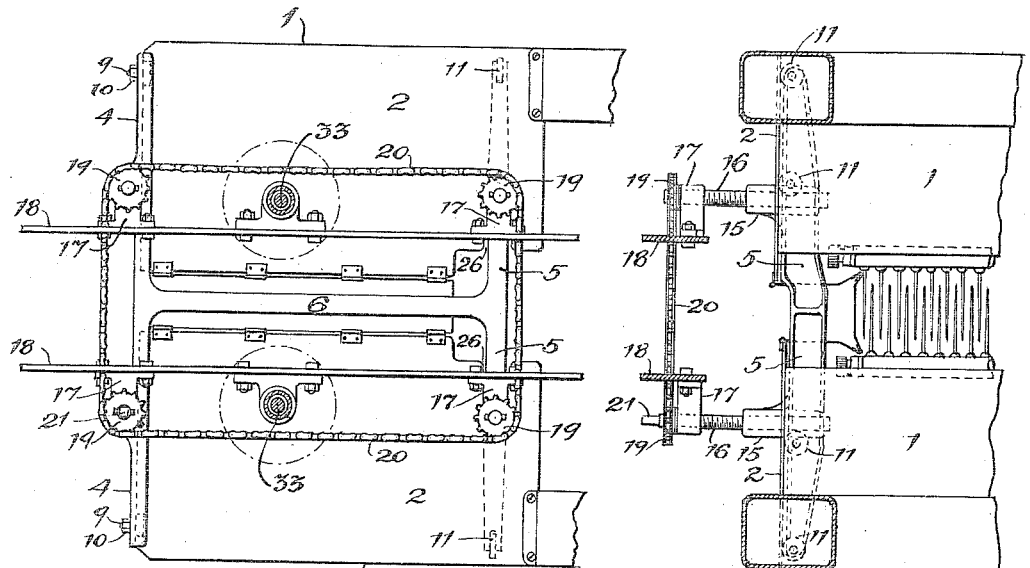

B. C. WHITE & A. CAMPBELL.
COTTON PICKER.
APPLICATION FILED OCT. 26, 1910.

1,044,611.

Patented Nov. 19, 1912.

2 SHEETS—SHEET 1.

WITNESSES:
F. E. Nares.
G. Blake

INVENTORS,
Bruce Clark White,
Angus Campbell.
BY
Edward A. Resch
ATTORNEY.

B. C. WHITE & A. CAMPBELL.
COTTON PICKER.
APPLICATION FILED OCT. 26, 1910.
1,044,611.
Patented Nov. 19, 1912.
2 SHEETS—SHEET 2.
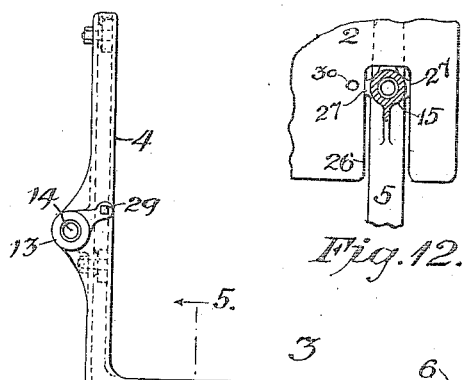
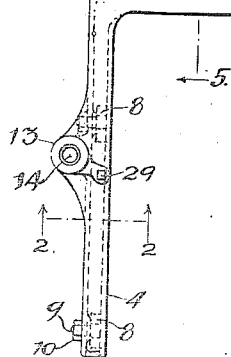
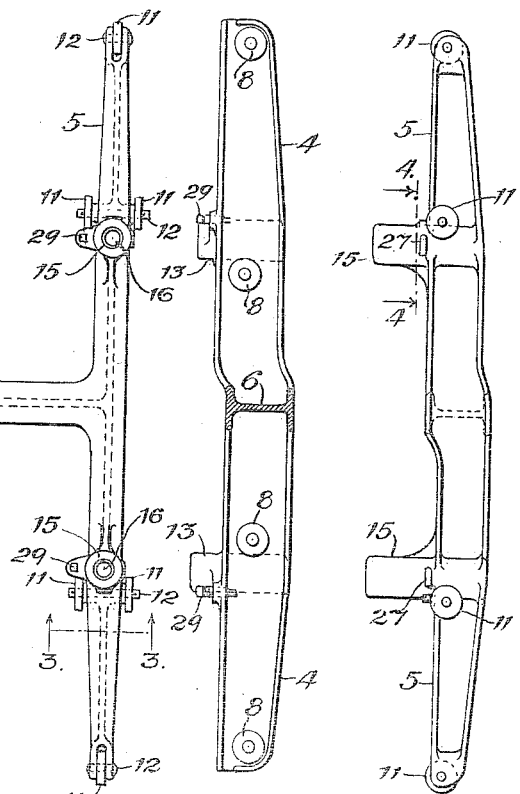
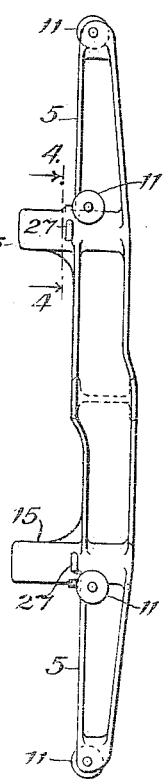
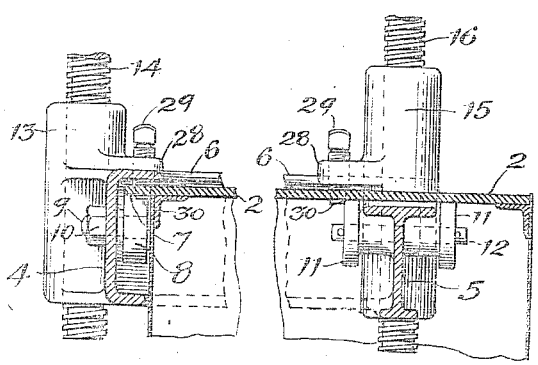
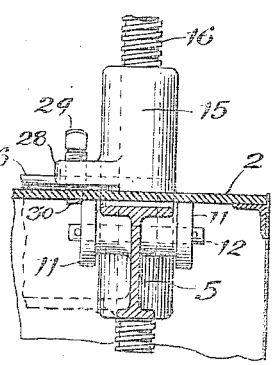
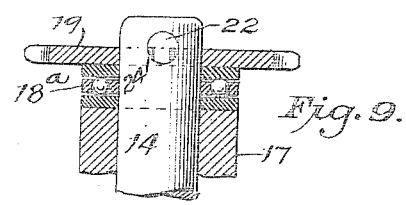
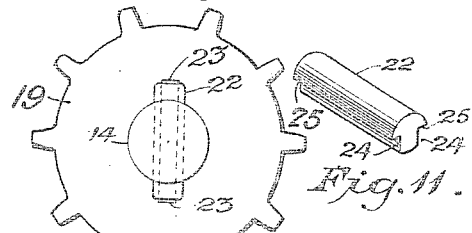
WITNESSES:
INVENTORS,
Bruce Clark White,
Angus Campbell.
BY
ATTORNEY.

UNITED STATES PATENT OFFICE.

BRUCE CLARK WHITE AND ANGUS CAMPBELL, OF WOONSOCKET, RHODE ISLAND, ASSIGNORS TO PRICE-CAMPBELL COTTON PICKER CORPORATION, OF WILMINGTON, DELAWARE, A CORPORATION OF DELAWARE.

COTTON-PICKER.

1,044,611.      Specification of Letters Patent.      Patented Nov. 19, 1912.

Application filed October 26, 1910. Serial No. 589,260.

*To all whom it may concern:*

Be it known that we, BRUCE CLARK WHITE, a citizen of the United States, and ANGUS CAMPBELL, a subject of the King of Great Britain, both residing at Woonsocket, in the county of Providence and State of Rhode Island, have invented certain new and useful Improvements in Cotton-Pickers, of which the following is a specification, reference being had therein to the accompanying drawings.

Our invention relates to improvements in the hanging of the picking mechanisms or drums of cotton-picking machines to the vehicle frame and the adjustment of their height in relation to the surface of the ground.

Our invention relates especially to that type of cotton pickers shown in B. C. White's application Serial No. 472,908, filed January 18, 1908, in which cotton-gathering fingers are thrust into cotton plants confined in a passage between two cotton-picking mechanisms, rotate therein, are withdrawn therefrom, pass through a stripper and return to be again thrust into the plants. The fingers are mounted in a series of vertical traveling carriers in which gearing is provided to utilize the movement of the carriers along their path, as means for rotating the fingers. The carriers are linked together at their extremities by endless chains trained about sprocket wheels mounted upon vertical shafts, one for each picking mechanism. Each picking mechanism is mounted in a box-like inclosure called a drum. There is one of these drums on either side of the row of plants, suspended from the frame of the vehicle, whose wheels traverse the spaces on either side of a row of plants. In machines of this type it is necessary to provide means for raising or lowering the picking mechanisms to correspond with the height of the plants or manner in which the ground has been cultivated. It is also necessary at times to move one or both of the drums bodily sidewise and away from the plants to give the operator access between picking mechanisms. It is important that both of these drum movements shall be quickly and conveniently made in the field.

One object of our invention is to provide means for raising or lowering both ends of both drums simultaneously and equally without the necessity for adjusting any other part to do so.

Another object of our invention is to provide a hanger frame adjustably hung from the machine frame upon which both drums may rest and upon which either drum may be moved laterally and away from the plants.

Other objects of our invention are to provide means for locking the drums in their operative positions and to adjust the distance between them when set for operation; also to provide for their complete removal from the machine.

Figure 3:
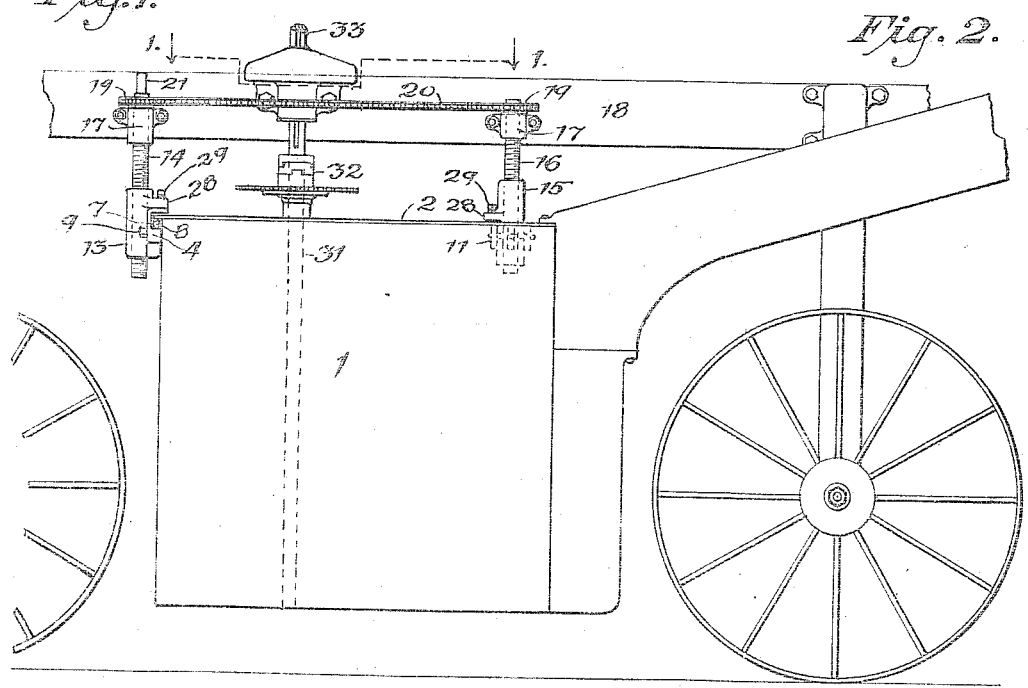

In the accompanying drawings, illustrating the principle of our invention and the best mode now known to us of applying that principle, Figure 1 is a top-plan view of the drums in operative position, and partly in section at line 1—1 of Fig. 3. Fig. 2 is a partial rear elevation thereof. Fig. 3 is a partial side elevation of a cotton picking mechanism embodying our invention. Fig. 4 is a top-plan view of the drum hanger frame. Fig. 5 is a view, partly in section at line 5—5 of Fig. 4, of the hanger frame. Fig. 6 is a rear elevation of the hanger frame. Fig. 7 is a cross section, on line 2—2 of Fig. 4, of a portion of the hanger frame. Fig. 8 is a cross section, on line 3—3 of Fig. 4, of a portion of the hanger frame. Fig. 9 is a detail sectional view of one of the sprockets on the elevating screws. Fig. 10 is a plan view of the elevating screw and its key pin. Fig. 11 is a detail view in perspective of one of the key pins. Fig. 12 is a detail horizontal section, on line 4—4 of Fig. 6, of the hanger construction.

Referring to the several figures of the drawings, in which similar characters of reference indicate like parts, 1, 1 are drums in which the picking mechanisms are mounted and inclosed. As these drums are duplicates, a description of one will suffice for the other. 2 is the top-plate of the drum.

3 is a general reference character for the hanger frame (Fig. 4). This frame is preferably made of one piece, and consists of the forward lateral arms 4, 4, the rear lateral arms 5, 5 and the middle connecting bar 6.

The top-plate 2 of the drum projects at its forward end, at 7, to form a ledge for its support upon rollers 8, 8 fitted to turn freely upon roller-pins 9, 9, secured to the arms 4, 4 of the hanger frame by nuts 10, 10. The top-plate 2 of the drum is supported at its rearward end upon rollers 11, 11 mounted to turn freely upon pins 12, 12 in the lateral arms 5, 5 of the hanger frame. The rollers 8 and 11 therefore support the drums, upon which they may be easily moved laterally.

The forward arms 4, 4 are each provided with a boss 13 having screw-threaded engagement with the forward lifting screws 14. The rearward arms 5, 5 are each provided with a boss 15 having screw-threaded engagement with the rear screws 16. These screws are supported by brackets 17 secured to the main frame 18 of the machine, in which they turn freely. Sprocket wheels 19 are keyed and endwise secured to the screws 14 and 16 above the brackets 17, 17. Between the sprockets 19 and the top surfaces of the brackets 17 are interposed anti-friction thrust collars 18$^a$, 18$^a$, to permit the screws to be turned easily. Trained about the four sprockets 19 is an endless sprocket-chain 20. One of the screws 14 is provided with a squared extension 21, to which may be applied a wrench or hand-wheel, whereby the operator may rotate the four screws simultaneously and equally, thus raising or lowering the hanger frame 3 and with it the drums 1, 1.

The sprocket 19 is secured to the screw 14 by a pin 22. This pin fits freely in a round hole through the upper end of the screw. Two keyways are cut in the sprocket at 23, 23. The pin 22 is grooved at 24, 24 to fit the keyways 23, 23 and to provide shoulders 25, 25 which rest upon the top surface of the sprocket. This construction provides means for supporting the screws upon the thrust collars 18$^a$ and keying them to the sprockets, and also provides for the ready detachment of the screws from the sprockets by withdrawing the pins 22, after having slightly raised the screws with the drums supported from the ground by blocks or otherwise.

The top-plate 2 of the drum is notched or slotted at 26 to permit the drum to be withdrawn. Projections 27, 27 on each side of the boss 15 are fitted to the slot to prevent endwise movement of the drum in relation to the frame 3.

Lugs 28, 28 on the bosses 13 and 15 have set-screws 29, 29 screwed through them into holes 30, 30 in the top-plate, whereby the drums may be secured in their operative position. To remove a drum it is necessary to disengage the set-screws.

Each drum mechanism is driven by a shaft 31 extending through the top-plate 2, shown in dotted lines in Fig. 3, and is provided with a detachable coupling 32 connecting it with the shaft 33. This latter shaft is arranged to slide vertically, and is connected by gearing to the motor.

Our improvment may be embodied in other forms without departure from our invention.

What we claim is:—

1. In a cotton picker, the combination of a lengthwise main frame, a crosswise hanger frame hung from the main frame by adjusting-screws, and a picking mechanism containing-drum supported on the crosswise hanger frame and movable along the latter in a direction crosswise of the machine.

2. In a cotton picker, the combination of a main frame, crosswise hanger frames hung therefrom, rollers on the hanger frames and picking mechanism containing-drums supported on said rollers and movable thereon in a direction crosswise of the machine.

3. In a cotton picker, the combination of a lengthwise main frame; an H-shaped transverse hanger frame, the transverse members whereof are each provided with rollers; adjusting screws holding the hanger frame in suspension from the main frame and picking mechanism containing-drums mounted on opposite end-portions of the hanger.

4. In a cotton picker, the combination of a lengthwise main frame; an H-shaped transverse hanger frame, the transverse members whereof are each provided with rollers; adjusting screws holding the hanger frame in suspension from the main frame and picking mechanism containing-drums mounted on opposite end-portions of the hanger, sprocket wheels fixed on the adjusting screws, a sprocket chain about the sprocket wheels, and a device for actuating the sprocket chain.

In testimony whereof we have hereunto affixed our respective signatures, in presence of witnesses.

BRUCE CLARK WHITE.
ANGUS CAMPBELL.

Witnesses:
    EDWARD S. BEACH,
    F. E. NARES,
    H. M. JOSEPH,
    J. S. RAPHAEL.